May 10, 1927.
H. P. STEVENS
MOVABLE DOOR PANEL
Filed Sept. 4, 1924
1,627,579
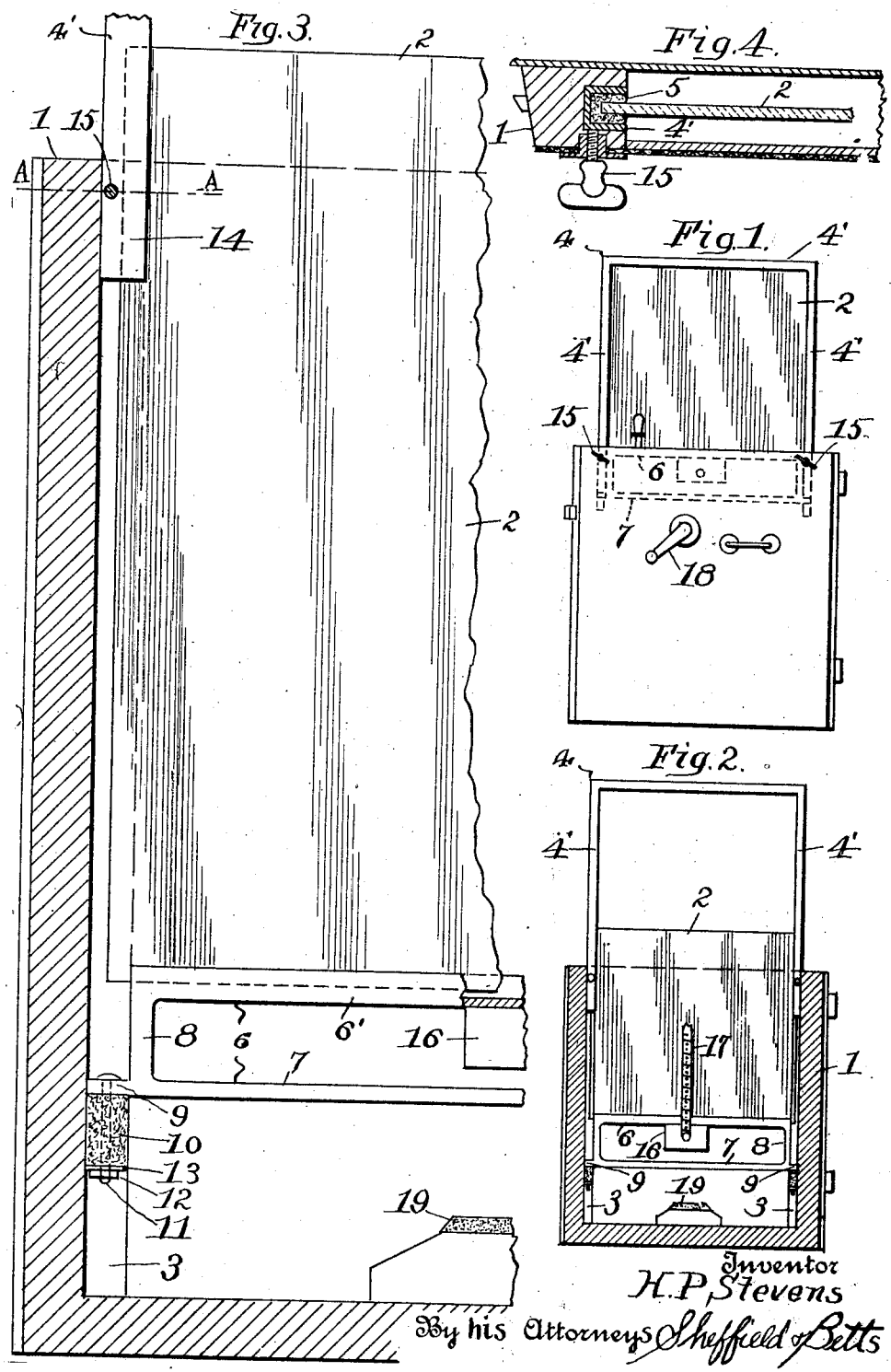

Patented May 10, 1927.

1,627,579

UNITED STATES PATENT OFFICE.

HARRY P. STEVENS, OF NEW YORK, N. Y.

MOVABLE DOOR PANEL.

Application filed September 4, 1924. Serial No. 735,835.

My invention relates particularly to doors for vehicles particularly those used with convertible bodies such as landaus, broughams and convertible limousines or sedans. In such cars or vehicles it is necessary to have a guide or frame for the glass window panel which may be entirely removed or depressed when the top or canopy is removed or folded back. Heretofore, in many instances guides for the glass window panel have been pivoted or hinged so as to be folded down and inward when the glass is withdrawn into the recess in the door. This arrangement has proved unsightly and inconvenient in addition to the disadvantage that the pivots or hinges often become loose and cause rattling when an automobile is traveling over uneven roads.

The object of my invention is, therefore, to provide a glass panel with guides or sash frames which shall obviate the above-mentioned disadvantages and which will be neat in appearance, easy to operate, free from the liability of rattling and which will be invisible when not in use.

My invention is particularly adapted for doors of automobiles in which the glass window panel may be raised and lowered by a crank and chain mechanism in connection with the usual balancing springs. However, my improvements may be used with any other type of device for raising or lowering windows, generally.

For a detailed description of one form of my improved door panel and frame, which I at present deem preferable, reference may be had to the following specification and to the accompanying drawing forming a part thereof, in which Fig. 1 is an interior elevation of a door showing the frame and window in raised position; Fig. 2 is a view showing the interior coverings and upholstery of the door removed, and showing the glass panel lowered to a position near the limit of its travel; Fig. 3 is a view similar to that of Fig. 2 but showing the left hand parts of the device on an enlarged scale; and Fig. 4 is a transverse sectional view taken substantially on the line A—A, Fig. 3.

Referring to the drawings the numeral 1 indicates the casing of the door and 2 the glass plate or panel. The door casing is provided with vertical grooves 3, at each side in which the glass panel and frame 4 therefor may travel up and down. The frame 4 for the glass panel 2 preferably comprises three channeled or grooved metallic bars 4', arranged in the form of an inverted U, the parallel portions engage the vertical margins of the window panel and are provided with suitable felt or similar fibrous cushions 5 which fit the panel loosely enough to allow the latter to slide therein and yet will prevent rattling. The lower margin of the glass panel is cemented or otherwise fastened in a grooved metallic cross-piece 6', preferably forming one member of a rectangular support 6, having a lower cross-piece 7 and vertical end members 8. The cross-piece 7 extends laterally into the grooves 3, thereby forming lugs 9 to which are attached two rectangular pieces of felt 10 or similar resilient or compressible material. The felt pads 10 are preferably held adjustably in position by means of a threaded stud 11 provided with a nut 12 and washer 13. This arrangement permits the felt pad to be compressed causing lateral expansion so that the same will fit the groove 3 with more or less friction, thereby forming a guide for the support 6 and the lower end of the glass plate 2 during its upward and downward movements.

The parallel members of the grooved frame 4 are made slightly longer than the length of the glass panel 2, so that when the latter is at the limit of its upward movement the lower ends 14 of said frame 4 will still lie in the grooves 3 for several inches. To retain said ends 14 in fixed positions when the panel is being raised or lowered independently of the frame, thumb screws 15 or other suitable fastening devices are provided.

The numeral 16 indicates a plate attached to the grooved cross-bar 6', and forms the support to which the chain 17 of the window operating device is fixed, the chain 17 being controlled by the operating crank 18, to raise or lower the glass panel or window. A buffer 19 is provided to limit and cushion the downward movement of the glass panel.

The operation of my improved device may be described as follows:

When the top or cover of the body is folded back or removed the glass panel 2 and frame 4 are depressed so that both are entirely within the recess provided in the door frame and the horizontal connecting bar of the frame 4 fills the slot in the top of the door frame, 1. In this position the lower ends 14 of the frame 4 rest on the lugs 9 of the cross-bar 7.

When it is desired to use the canopy or closed top of the body and to close the window opening, the thumb screws 15 are loosened and the window raising lever or crank 18 is turned until the glass panel 2 and the frame 4 are raised to the limits of their upward movements. The thumb screws 15 are then tightened to hold the frame 4 in its fixed position.

Thereafter, when it is desired to open or partially open the window, the glass panel 2 is operated in the usual way by turning the lever or crank 18 or otherwise, according to the means provided for that purpose.

When it is necessary to retract the frame 4 and glass 2 within the door, the glass may be raised until the window is closed, the thumb screws are loosened and then the window and frame lowered together. If necessary, a slight downward pressure may be placed upon the cross-bar 4' by hand, while retracting the glass panel.

Having thus described this form of my invention I do not wish to be understood as being limited to the details of form or the precise arrangement of parts set forth above, for various changes may be made by those skilled in the art without departing from the spirit and scope of my invention.

What I claim and desire to protect by Letters Patent is:

1. A movable closure for the upper portion of vehicle doors and similar structures having a recessed body portion, comprising a movable plate adapted to be contained therein, slidable guide members adapted to reciprocate in channels in said body portion, means connected with the lower end of said plate for guiding the same within said recessed portion, and means for locking said guide members in position independently of said plate.

2. A movable closure for the upper portion of vehicle doors and similar structures having a recessed body portion, comprising a movable plate adapted to be contained therein, slidable guide members adapted to reciprocate in channels in said body portion, means for locking the same in position independently of said plate, and means carried by the lower end of said plate and projecting beneath said members for guiding the plate within said body portion, and comprising frictional means to retard the movement of said plate.

3. A movable closure for the upper portion of vehicle doors and similar structures having a recessed body portion, comprising a movable plate adapted to be contained therein, slidable guide members adapted to reciprocate in channels in said body portion, means for locking the members in position independently of said plate, a cross-bar connected with said plate, and means connected with said cross-bar and extending into said channels beneath said members for guiding the lower end of said plate, said means comprising resilient material adapted to frictionally engage the surfaces in said channels.

4. A movable closure for the upper portion of vehicle doors and the like having a recessed body portion, comprising a slidable inverted U-shaped guide frame adapted to be contained therein, a glass plate adapted to slide within said frame, manually operated means adapted to engage the latter so as to cause said frame and plate to be raised together, and means for locking said frame in its raised position independently of said plate whereby said plate may be moved downward independently of said frame after the latter is locked in position.

5. In combination with a vehicle door or the like having a recessed body, a grooved slidable inverted U-shaped frame contained therein, a glass plate adapted to slide within the grooves of said frame, means adapted to engage the latter so as to cause said frame and plate to be raised together, frictional means carried by said plate for guiding and retarding movement thereof independently of said frame, and means for locking said frame in its raised position independently of said plate, so as to permit the independent movement of said plate.

New York, New York, September 3rd 1924.

HARRY P. STEVENS.